Nov. 22, 1960
C. W. WOOD ET AL
2,961,187
CARRIER FOR PNEUMATIC TUBE SYSTEM
Filed May 27, 1959
4 Sheets-Sheet 1
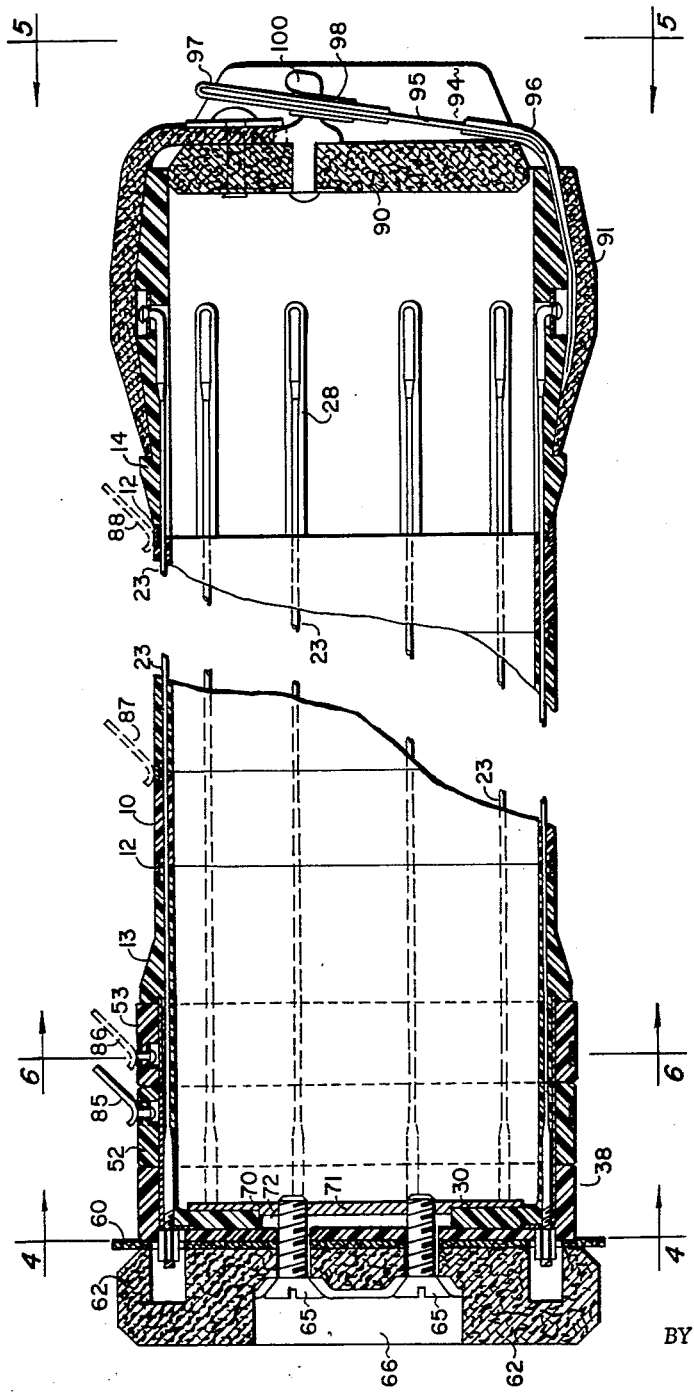
INVENTORS
Norton T. Pierce
Charles W. Wood
BY D. Emmett Thompson
ATTORNEY

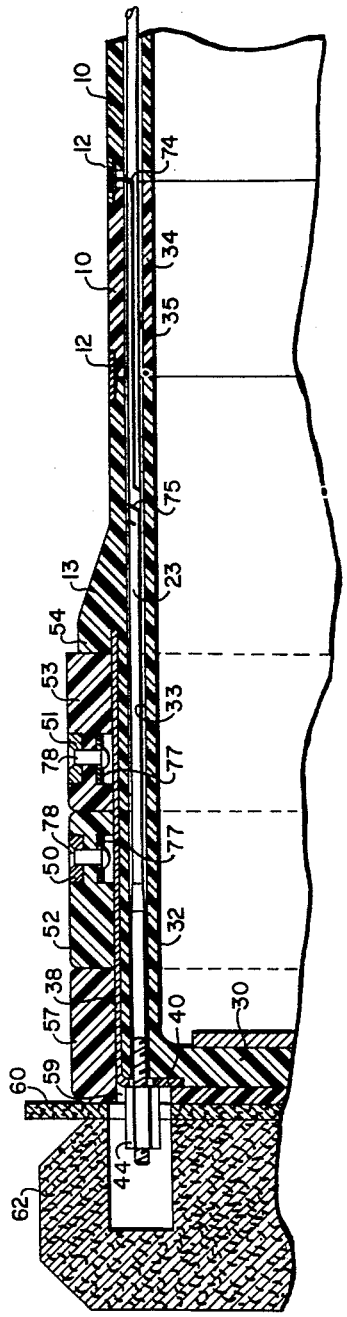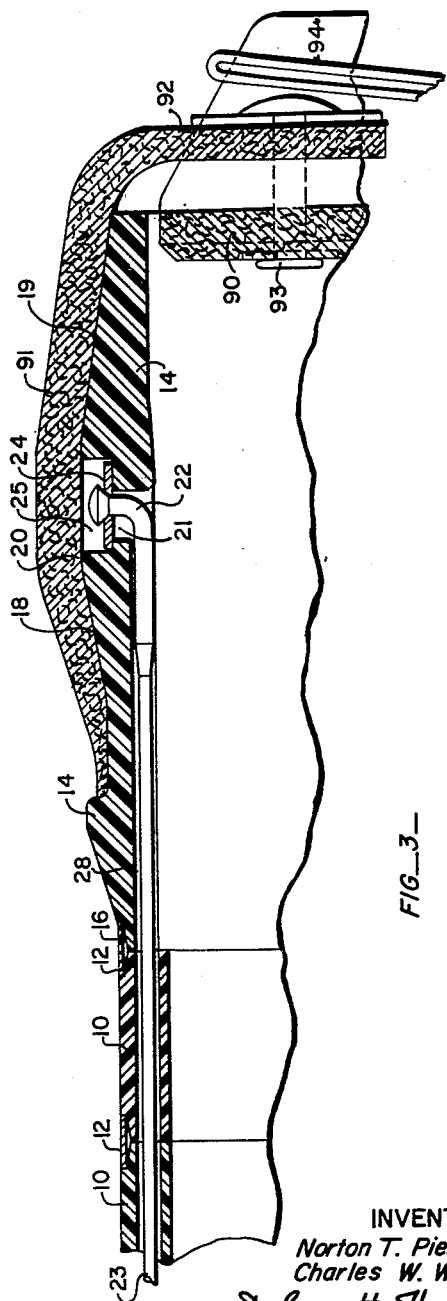

Nov. 22, 1960 C. W. WOOD ET AL 2,961,187
CARRIER FOR PNEUMATIC TUBE SYSTEM
Filed May 27, 1959 4 Sheets-Sheet 3
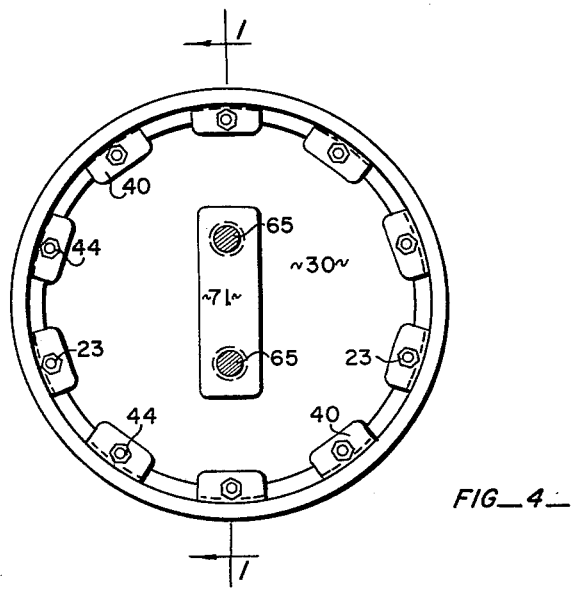
FIG_4_
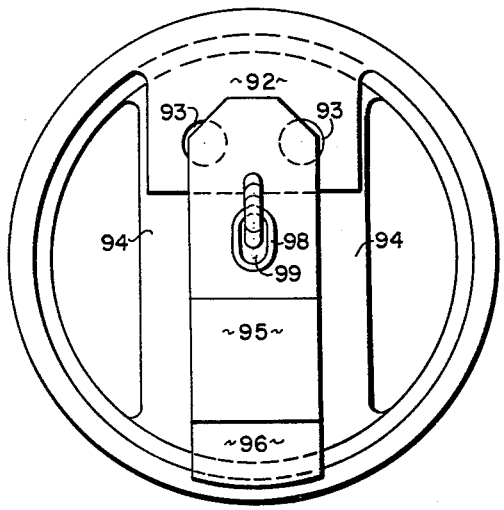
FIG_5_
INVENTORS
Norton T. Pierce
Charles W. Wood
BY D. Emmett Thompson
ATTORNEY Nov. 22, 1960     C. W. WOOD ET AL     2,961,187
CARRIER FOR PNEUMATIC TUBE SYSTEM
Filed May 27, 1959     4 Sheets-Sheet 4
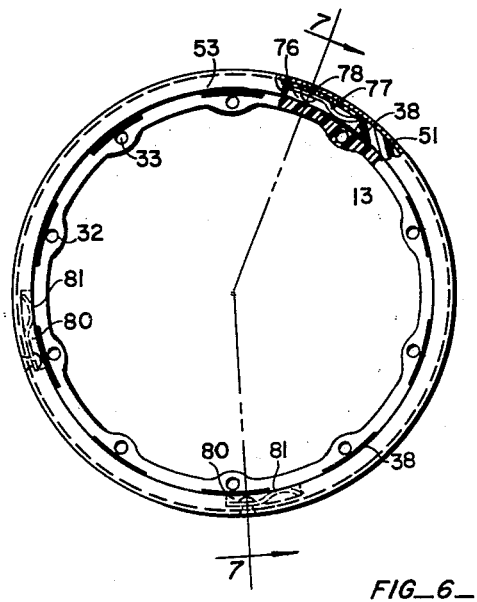
FIG_6_
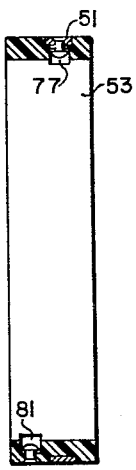
FIG_7_
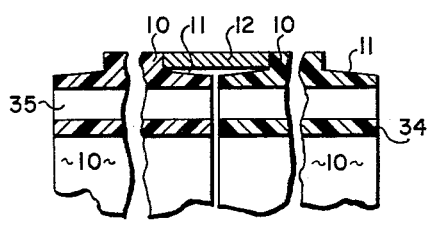
FIG_8_
INVENTORS
Norton T. Pierce
Charles W. Wood
BY D. Emmett Thompson
ATTORNEY United States Patent Office 2,961,187
Patented Nov. 22, 1960

2,961,187

CARRIER FOR PNEUMATIC TUBE SYSTEM

Charles W. Wood, Wellesley, and Norton T. Pierce, Concord, Mass., assignors to Lamson Corporation, Syracuse, N.Y., a corporation of New York Filed May 27, 1959, Ser. No. 816,109

6 Claims. (Cl. 243—35)

This invention relates to carriers for pneumatic tube systems and more particularly to carriers for automatic tube systems wherein the carriers are provided with contact rings and selecting rings which may be coded or preset for cooperation with fixed contacts in the tube system for operating switching devices for the direction of the carrier over a selected loop of the system and discharge of the carrier at a selected station in the selected loop.

Heretofore, carriers for automatic pneumatic tube systems have been expensive to manufacture and the structural arrangement involved in the conventional carrier of this type is such that only minor repairs may be made to the carrier. If the carrier has become damaged or defective to any appreciable extent, especially in connection with the contact rings, the carrier has to be discarded and a new one used in its place.

This invention has as an object a carrier for pneumatic tube systems embodying a structural arrangement particularly economical to manufacture and assemble, and particularly durable in use.

The invention has as a further object a tube carrier for automatic pneumatic tube systems, the main portion of the carrier being formed of a plurality of identical parts or sections arranged in a cylindrical formation with front and rear end members, the whole being secured together in a rigid assembly with contact rings and selecting rings by means of a series of tie rods which also serve as electrical conductors between the contact rings and the selecting rings, all whereby carriers of various lengths can be readily assembled from stock parts and whereby, in the event a carrier becomes defective or damaged, it may be readily disassembled and the defective part, or section, replaced.

The invention consists in the novel features and in the combinations and constructions hereinafter set forth and claimed.

In describing this invention, reference is had to the accompanying drawings in which like characters designate corresponding parts in all the views.

In the drawings:

Figure 1 is a lengthwise sectional view of a carrier embodying our invention taken on a line corresponding to line 1—1, Figure 4.

Figure 2 is an enlarged fragmentary view of the upper left portion of Figure 1.

Figure 3 is a view, similar to Figure 2, of the upper right portion of Figure 1.

Figure 4 is a view taken on line 4—4, Figure 1.

Figure 5 is an end elevational view looking to the left, Figure 1.

Figure 6 is a cross sectional view of one of the selecting rings taken on line 6—6, Figure 1.

Figure 7 is a sectional view taken on line 7—7, Figure 6.

Figure 8 is an enlarged sectional view of two contiguous body members.

The carrier, in general form, is of cylindrical formation. The main body portion consists of a plurality of annular members 10. The members 10 are formed with tapering end portions 11 of reduced diameter. The members 10 are arranged in end to end relation, whereby the reduced tapered end portions 11 of a pair of contiguous members provide a circumferentially extending groove in which there is mounted a metallic contact ring 12. The number of annular members 10 employed depends upon the desired length of the carrier.

A front end member 13 of general cylindrical form is positioned at one end of the assembly of the members 10, and a rear end member 14 is positioned at the opposite end of the assembly. The rear end member 14 is open at its rear end, and is formed at its forward end with a tapered portion 16 complemental to the tapered end portions 11 of the members 10 to provide a groove for mounting a contact ring 12 between the rear end member and the adjacent annular member 10. The end member 14 is formed on its periphery with tapered surfaces 18, 19, to provide a thickened portion 20 which is formed with radial apertures 21 spaced apart circumferentially of the end members. These apertures are for the reception of outwardly bent head portions 22 of tie rods 23. The head portions 22 of the tie rods are provided with washers 24 positioned in the counterbore portion 25 of the apertures 21. The apertures 21 communicate with slots 28 formed on the inner surface or bore of the end member 14 and extending forwardly from the apertures 21.

The front end member 13 is of substantially cylindrical form and provided with a discoidal portion 30 forming a closure for the forward end of the carrier. The bore of the front end member 13 is formed with circumferentially spaced apart ribs or thickened portions 32 extending lengthwise of the member and each being formed with an aperture 33 through which the tie rods 23 extend. The intermediate sections or annular members 10 are formed with ribs 34 having apertures 35 arranged in register with the grooves or slots 28 in the rear end member, and with the apertures 33 in the front end member, whereby the tie rods extend from the rear member 14 forwardly through the annular members 10 and through the front member 13.

The front member 13 is formed on its periphery with lenthwise extending shallow grooves, in each of which tnere is positioned a contact strip 38. The contact strips 38 have inwardly bent end portions 40 positioned in radially disposed grooves formed in the forward end of the member 13. These bent portions 40 are apertured to receive the tie rods 23, on the projecting forward ends of which nuts 44 are threaded to draw the assembly together in rigid cylindrical form.

The intermediate annular members 10 and the end members 13, 14, are formed of dielectric material, whereby the contact rings 12 and the tie rods 23 are insulated one from the other.

The annular members 10 and the end members 13, 14, are economically manufactured by being moulded, or formed from suitable plastic material.

As the carrier travels through the tube system, the contact rings 12 are engaged by fixed contacts in the tube system, and also one or more selecting contact rings 50, 51, are engaged by the fixed contacts, these contacts serving to energize circuits for the control of switching apparatus for directing the carrier through a desired loop portion of the system, and for discharging the carrier at a desired station in the selected loop portion. The selecting contact ring 50 is carried by an annular member 52 of insulating material, and the contact ring 51 is carried by an annular member 53 of insulating material. These annular members 52, 53, are rotatably mounted on the outer surface of the front end member 13. The rings 52, 53, are arranged in abutting relationship, the ring 53 abutting against a shoulder formed by an enlarged portion 54, and the ring 52 abuts against a spacer ring 57 having a discoidal portion 58 overlying the discoidal portion 30 of the front end member 13. The spacer 57 is formed with enlarged apertures 59 for the reception of the tie rod nuts 44. An accelerator disk 60 of flexible material is positioned on the forward end of the spacer 57 and is also provided with clearance apertures for the nuts 44. A cylindrical bumper 62 of resilient material is positioned on the forward face of the accelerator disk 60. This assembly is secured to the carrier by screws 65, the heads of which are positioned in a countersunk portion 66 of rectangular form provided in the bumper disk 62. The screws extend through apertures formed in the bumper disk 62 and through apertures formed in the accelerator disk 60. The screws 65 thread into a disk 70 positioned on the inner surface of the discoidal portion 30 of the front end member and having a thickened rectangular portion 71 in a rectangular aperture 72 formed in the discoidal portion 30.

Each of the contact rings 12 is connected to one of the tie rods 23, as by a wire 74, soldered, or otherwise electrically connected as at 75 to the tie rod, the apertures in the ribs 32, 34, of the front end member 13 and the annular members 10 being sufficiently large to accommodate the tie rod 23 and the connecting wires 74.

The ring members 52, 53, are formed on their inner surfaces with circumferentially extending recesses 76 in which are positioned spring contact fingers 77. One end of the fingers 77 is fixedly secured to the ring member 52, 53, as by rivets 78. The free curved end of the contact fingers 77 yieldingly bear against the periphery of the end member 13 and accordingly, when the ring members 52, 53, are rotated on the end member, the contact 77 is moved into engagement with one of the contacting strips 38, whereby the selecting contact ring, to which the contact 77 is affixed, becomes electrically connected through the contact strip 38, tie rod 23, wire 74, to one of the contact rings 12.

Each of the ring members 52, 53, is formed with one or more additional recesses 80, in each of which there is mounted a similar spring finger 81. The recesses 80 are offset axially from the recesses 76. This arrangement lessens the likelihood of the ring members 52, 53, from canting, or binding, upon the end member, and makes certain that the contact fingers 77 make good electrical contact with the contact strips 38.

If the automatic tube system comprises only one loop, the ring member 53 will only be employed, and suitable indicia, such as numbers, will be applied to the periphery of the ring member to indicate which of the tie rods is electrically connected to the ring 51. In the more extensive systems having more than one operating loop, the ring 52 is employed and the periphery may carry indicia, such as letters, to indicate which tie rod is electrically connected to the ring 50.

In Figure 1, the fixed contacts in the system are indicated in dotted outline at 85, 86, for contacting the selecting rings 50, 51, and at 87, 88, the fixed contacts for engaging certain of the contact rings 12. In this arrangement, the ring 52 is rotated to select the desired loop of the system. The ring 53 is then rotated to select the desired station in the selected loop for the discharge of the carrier. As the carrier moves through the tube, a circuit will be completed through the contact 85 to one of the contacts 87, 88, to operate the switching mechanism to direct the carrier into the desired loop of the system. When the carrier enters this loop, contact 86 will be connected to the other of the contacts 87, 88, to effect discharge of the carrier at the selected station in the loop.

The rear end member 14 is provided with a circular closure 90. The member 14 is encircled by a cover of leather, or fibrous material 91. This covering is formed with a tongue portion 92 connected at its free end to the closure 90, as by rivets 93, the tongue 92 being positioned between a pair of ribs 94 extending in spaced apart relation across the outer side of the closure 90, the tongue 92 serving as a hinge for moving the closure 90 into and out of closure position.

The closure 90 is held in closed position, as shown in Figures 1 and 3, by a strip 95 of electric material, one end of which is secured between the free ends of a pair of strips 96 formed of fabric material, or the like. The strips 96 being positioned between the end member 14 and the covering 91, see Figure 1, by means of adhesive, or the like. The opposite end of the elastic strip 95 is secured in a piece of fabric material or the like 97, folded upon itself and provided with a grommet 98 having an elongated aperture 99 formed therein to receive a hook member 100 fixedly secured to the closure 90. Heretofore, it has been conventional practice to provide the closure with an outwardly projecting headed stud to receive a snap fastener which, if not carefully and properly engaged with the stud, will permit the closure to move to open position.

With the arrangement just described, the operator must stretch the elastic strip 95 in order to manipulate the grummet 98 over the hook 100 and, when released, the elastic strip 95 serves to maintain the grummet in engagement with the hook, whereby the closure is maintained in closed position.

What we claim is:

1. A carrier for pneumatic tube systems comprising a plurality of annular members formed of dielectric material and arranged in end to end formation, an end member positioned at each end of said formation, a series of tie rods extending lengthwise of said formation for securing said annular members and end members together in a rigid cylindrical body, a contact ring encircling each of said body members, each of said contact rings being electrically connected to one of said tie rods, a selecting contact ring mounted on one of said end portions for rotation about the axis of the body, and contact means operable upon rotation of said selecting ring to selectively connect the same to said tie rods.

2. A carrier for pneumatic tube systems comprising a plurality of annular members formed of dielectric material and arranged in end to end formation, an end member positioned at each end of said formation, said annular members and said end members being formed with aligned apertures extending axially thereof, a series of tie rods positioned in said apertures and extending lengthwise of said formation for securing said annular members and end members together in a rigid cylindrical body, a contact ring encircling each of said annular members and being connected electrically to one of said tie rods, a selecting contact ring mounted on one of said end members for rotation about the axis of the body, and contact means operable upon rotation of said selecting ring to selectively connect the same to said tie rods.

3. A carrier for pneumatic tube systems comprising a plurality of annular members formed of dielectric material and arranged in end to end formation, an end member positioned at each end of said formation, a series of tie rods extending lengthwise of said formation for securing said annular members and end members together in a rigid cylindrical body, the end portions of said annular members being of reduced diameter, whereby the abutting end portions of said annular members are provided with a circumferentially extending groove, a contact ring positioned in each of said grooves and each of said contact rings being electrically connected to a tie rod, a selecting contact ring mounted on one of said end members for rotation about the axis of the body and contact means operable, upon rotation of said selecting ring, to selectively connect the same to said tie rods.

4. A carrier for automatic pneumatic tube systems comprising a plurality of annular members formed of dielectric material, said members being arranged in end to end relation to form a cylindrical stack formation, an end member positioned at each end of said formation, a series of tie rods extending lenghtwise of said formation for securing said annular members and end members together in a rigid cylindrical body, said annular members being formed with tapered end portions of reduced diameter providing a circumferentially extending groove at the abutting ends of said annular members, a contact ring positioned in each of said grooves, said rings serving to maintain said annular members in alignment and each of said rings being electrically connected to a tie rod, a selecting contact ring mounted on one of said end members for rotation about the axis of the body, and contact means operable upon rotation of said selecting contact ring to selectively connect the same to said tie rods.

5. A carrier for automatic pneumatic tube systems comprising a plurality of annular members formed of dielectric material arranged in end to end formation, an end member positioned at each end of said formation, one of said end members being formed in its peripheral surface with a circumferentially extending groove, a series of tie rods extending lengthwise of said formation for securing said annular members and end members together in a rigid cylindrical body, a contact member connected to each of said tie rods and having a portion positioned in the groove, a selecting contact ring mounted in said groove for rotation therein about the axis of the formation, said selecting ring having a contact engaging portion successively movable into engagement with said tie rod contacts upon rotation of said contacting ring, and a contacting ring associated with each of said annular body members and electrically connected to one of said tie rods.

6. A carrier member for penumatic tube systems comprising a plurality of annular members formed of dielectric material and arranged in end to end formation, a front cylindrical end member positioned at one end of said formation, a rear cylindrical end member positioned at the opposite end of said formation, a series of tie rods connected at their ends to said end members and extending lengthwise of said formation for securing said annular members and end members together to form a rigid cylindrical body, said front end member being formed with a discoidal portion forming an end closure for said body, said rear end member being provided with a removable closure.

References Cited in the file of this patent

UNITED STATES PATENTS

| | | |
|---|---|---|
| 1,332,901 | Jennings | Mar. 9, 1920 |
| 1,647,788 | Dinspel | Nov. 1, 1927 |
| 2,268,852 | Anderson | Jan. 6, 1942 |
| 2,888,218 | Kuhn | May 26, 1959 |

UNITED STATES PATENT OFFICE

CERTIFICATION OF CORRECTION

Patent No. 2,961,187                                  November 22, 1960

Charles W. Wood et al.

It is hereby certified that error appears in the above numbered patent requiring correction and that the said Letters Patent should read as corrected below.

Column 4, line 7, for "electric" read -- elastic --; colum 5, line 3, for "lenghtwise" read -- lengthwise --; column 6, lin 7, for "penumatic" read -- pneumatic --.

Signed and sealed this 2nd day of May 1961.

(SEAL)
Attest:

ERNEST W. SWIDER                                      DAVID L. LADD
Attesting Officer                                       Commissioner of Patents